Patented Nov. 15, 1949

2,487,892

UNITED STATES PATENT OFFICE 2,487,892

MANUFACTURE OF CELLULOSE ACETATE

George A. Richter and Robert H. MacClaren, Rochester, N. Y., assignors to Eastman Kodak Company, Rochester, N. Y., a corporation of New Jersey No Drawing. Application March 26, 1946, Serial No. 657,346

5 Claims. (Cl. 260—229)

This invention relates to a process of making cellulose acetate from cellulose in sheet form in which water is sucked through the sheet, and the water is thereafter replaced by a mixture of glacial acetic acid (or other lower fatty acid) and catalyst so as to quickly prepare the cellulose for esterification.

It is commonly recognized in the cellulose ester art that cellulose esters of good quality are only prepared by esterifying a cellulose which has been activated. Most of the pretreatment processes have involved a preliminary soaking of the cellulose with acetic acid, either with or without catalyst. Many of these prior pretreatment processes have involved the use of glacial acetic acid. However, of late years investigators have stated that the use of aqueous acetic acid for pretreating cellulose would facilitate that operation. The disadvantage of using aqueous acid is that upon contact of the water thereof with acid anhydride a vigorous reaction occurred, and, therefore, cellulose containing a considerable proportion of water was not suited for use in esterification processes. Some of the prior disclosures referring to the pretreatment of cellulose are as follows:

U. S. Patents Nos. 1,338,661 and 1,265,216 of Lindsay describe the preliminary treatment of cellulose with aqueous acetic acid (75-98%). After the acid is uniformly spread through the cellulose, the esterification is carried out. The cellulose which was treated in accordance with these disclosures was in bulk form.

U. S. Patent No. 1,731,299 of Dreyfus discloses a method of treating cellulose in bulk form with acetic acid having an 80-100% concentration at an elevated temperature until the cellulose is activated. This pretreatment method lasted one to six hours. This patent states that with more dilute acid the pretreatment necessitated a longer time to obtain activation.

In some cases, such as U. S. Patent No. 1,752,596 of Hubert the cellulose was treated in bulk form with aqueous liquid, and the aqueous liquid was then removed therefrom by filtering and displacing with acetic acid. This involved a batch method, and the filter cake formed in such an operation is not characterized by uniform distribution of fibers as is found in the cellulose sheets ordinarily marketed.

One object of our invention is to provide a method for activating cellulose in a rapid manner. Another object of our invention is to provide a method of manufacturing cellulose esters in which sheet cellulose is utilized as the starting material. A further object of our invention is to provide a process in which the cellulose to be esterified has the catalyst quickly, but uniformly, distributed therethrough. Other objects will appear herein.

We have found that cellulose sheet through which water is sucked for a few seconds, followed by displacement of that water with glacial acetic acid and catalyst, preferably by sucking through glacial acetic acid and then glacial acetic acid and catalyst, gives a product which is eminently suited for use in esterification processes, and the cellulose esters resulting therefrom have excellent haze and color characteristics.

Cellulose, particularly in the form of wood pulp, is ordinarily marketed in the form of sheets, such as have been loosely laid down upon a paper machine. These sheets have a fairly uniform structure, and we have found that their activation may be satisfactorily caried out by the use of a suction apparatus in which the treating liquid is drawn therethrough. Our invention involves the use of cellulose in sheet form, and this cellulose may be cotton linters or wood pulp cellulose, from sulfite, kraft, or multiple cook, either mercerized or unmercerized. We have found, in fact, that mercerized cellulose which ordinarily is unsuitable for use as the starting material in acetylation processes is of special value in our invention to make esters having good haze characteristics and low color. The cellulose sheets as used in our process may be either in the form of single sheets, such as having a thickness of $1/20$ inch, or they may be in the form of several sheets together. The only difference in operation occasioned by change in thickness of sheet is that a higher degree of suction must be employed. For instance, with a one-sheet thickness a suction of four inches of water would be sufficient, whereas if as much as four sheets are combined, four to five inches suction of mercury would probably be required. The degree of suction employed would also be determined by the density of the pulp being treated as well as by its general structure. For instance, sheets of high $\alpha$-cellulose, acetylation grade wood pulp having a uniformly distributed fibrous structure and a density of no more than .6 or .7 and a dry weight of about 100 pounds per 1000 square feet would be eminently suitable for use in accordance with our invention. Our invention involves the sucking of the pretreating liquids through the pulp sheet, and the conditions which will be conducive to penetration of the sheet by the liquid is a detail of operation which can be readily adjusted for the cellulose sheet which is employed.

Our process may very well be carried out by passing the dry cellulose sheet (either bone-dry or air-dry) while under a water spray, over suction boxes whereby water is sucked through the sheet at a rapid rate. The temperature used is not especially critical, 30° C. being quite suitable, although activation is obtained with any temperature from room temperature up to boiling. This sucking of water through the sheet need take only ten to twenty seconds. The pH of this water may be 5.5–7.5 (the usual pH of natural water). The next operation is to remove the water from the sheet without interfering with the activity of the cellulose. For commercial reasons it is preferred to first pass the sheet cellulose through squeeze rolls so as to reduce the water content down to 50%. However, this step is optional with the individual operator. The cellulose sheet is then passed under a spray of glacial acetic acid (or other lower fatty acid) and over suction boxes so as to suck acetic acid through the cellulose sheet, thereby displacing the water. This operation also can be carried out in ten to twenty seconds, the acid being at a temperature, preferably of 50° C., although the same temperature as employed in the water treatment may be employed in the displacing of the water. The sheet is then led under a spray of glacial acetic acid and catalyst, such as 0.5–3% of sulfuric acid so as to uniformly introduce catalyst into the cellulose sheet. Some types of cellulose require less depolymerization to obtain ester dopes of desired viscosity. Others require more hydrolyzing reagents than the usual run of cellulose now available. Hence, the sulfuric acid content of the pretreating liquid should be adjusted to the proportion of the cellulose in question and to the viscosity levels sought. This operation may be carried out at 30° C. and for a time of fifteen seconds, although the time may vary from ten to twenty seconds and the temperature may be from 16° C. to boiling. After the mixture of glacial acetic acid and sulfuric acid is sucked through the sheet, the sheet is squeezed, such as by pressing rolls so that the cellulose constitutes about 50% thereof. It is usually preferable to allow the sheet to stand for ten or fifteen minutes prior to introducing it into an acetylation mixture. In some cases, however, the cellulose is well activated without this holding period. In other cases much better activation of the cellulose is obtained therewith. If the acetic acid and catalyst are applied cold to the cellulose sheet, or if the sheet after treatment is passed over refrigerated rolls, that sheet may be held for up to three hours, if no heat is applied, prior to its use in the esterification mixer.

Often in actual operations it is not convenient to use the cellulose immediately and in such case cooling to allow standing is desirable. Some alternative procedures which may be used are:

1. After the preliminary treatments described catalyst and acetic acid having a temperature of about 30° C. is sucked through the sheet, the sheet is pressed and chilled to about 16° C. and held for the loading period (two to three hours).

2. Catalyst and acetic acid at 30° C. sucked through the sheet as in 1, then catalyst and acetic acid of about 16° C. temperature pulled through, the sheet pressed and held for any time up to three hours.

3. After the preliminary treatment with water and displacing by fatty acid, catalyst and acetic and propionic acids are sucked through the sheet at 30° C., then catalyst and acetic and propionic acids (the propionic in sufficient amount to prevent solidifying) sucked through at 0° C. and held for the time desired as long as the low temperature is held.

In the displacing of water with acid, any of the lower fatty acids may be employed whether acetic, propionic, or butyric acid or their mixture. As acetic acid solidifies easily when cooled, it is often preferable to dilute it up to as much as equal parts with propionic or butyric acids when used. Although sulfuric acid is most commonly employed in cellulose esterification operations, nevertheless our process contemplates the use of acylation catalysts generally in the step of introducing catalyst to the cellulose sheet in accordance with our invention.

The cellulose, after the pretreatment described, is then ready for treatment with fatty acid anhydride, with or without further catalyst, for esterification thereof. A convenient method of operation is to comminute or fragment the cellulose sheet and then mix the comminuted cellulose with lower fatty acid anhydride accompanied by the usual temperature control to give a cellulose ester of the required viscosity. We have found that whereas with pulp using a normal pretreatment and acetylation, a cellulose acetate is obtained having a haze of 10 cm. and a color of 300; use of the process described herein gives a product of vastly improved haze (at least 33 cm.) and a greatly reduced color (100).

The cellulose sheet pretreated in accordance with our invention may be esterified by a continuous esterification method, this combination being the invention of others.

The entire operation up to the time of mixing the cellulose with the acetic anhydride, or other fatty acid anhydride, need not take over two minutes if no hold-over is necessary after the sulfuric-acetic acid pull-through in order to reduce the viscosity of the cellulose. Also, we have found that the pretreatment method in accordance with our invention is so effective that the acetylation time is kept to a minimum by the use of a so-treated cellulose. Our invention makes possible the use of cellulose esterification mixers to full advantage and is especially of value where a battery of cellulose esterification mixers is being operated, in that the cellulose may be pretreated and almost immediately introduced into the esterification vessel. The following example illustrates our invention:

The pulp sheet used was a high α-cellulose acetylation-grade wood pulp and has a weight of 100 pounds per 1000 square feet, a thickness of 0.48 inch and a moisture content of 6%. A 9-gram sheet was taken and 250 cc. of distilled water was passed through the sheet at 30° C. in about ten seconds. Pressure drop through the sheet was 9 cm. of mercury.

The water was then displaced by passing 250 cc. of glacial acetic acid at 30° C., in about ten seconds with 9 cm. pressure difference. 250 cc. of glacial acetic acid containing 1.5% of sulfuric acid was then passed through the sheet under the same time, temperature and pressure conditions as in the preceding step. The sheet was then pressed to a fiber content of 50%. About 5.5% sulfuric acid was retained by the sheet. The squeezed sheet was transferred to a container and held at 30° C. for fifteen minutes.

Thirty-one cc. of acetic anhydride and 64 cc. of acetic acid having a temperature of 11° C. were added, and the container was tumbled for one hour at 38° C. The resulting dope was then diluted with 30 cc. of 87% acetic acid added at 5° C. The final product was found to be of excellent clarity and color. Compared with a cellulose acetate dope prepared by the customary procedure the test results were as follows:

|  | Haze | Color | Viscosity |
|---|---|---|---|
|  | Centimeters | | Seconds |
| Regular | 10 | 250 | 60 |
| Pretreated as described herein | 32 | 110 | 62 |

The dope, if a hydrolyzed cellulose ester is desired, may be mixed with aqueous acetic acid to impart a water content of 5-10% and allowed to stand at 100° F. for 20-40 hours.

The cellulose ester is precipitated by any desired method, such as pouring into agitated aqueous precipitating acid.

Our invention is adapted to use in the preparation of lower fatty acid esters of cellulose generally. For instance, the pretreated cellulose may be mixed with butyric anhydride allowing the temperature to rise to 90-100° F. to give a cellulose acetate butyrate. If desired, the cellulose may be esterified with propionic anhydride to obtain a propionic acid ester of cellulose. In the description of the invention herein and the example, instead of acetic acid propionic or butyric acid or the mixture of either with acetic acid be employed. For instance, the cellulose sheet may be de-watered with propionic or butyric acid, and then catalyst dissolved in propionic or butyric acid may be pulled through the sheet. Alternatively the water in wet cellulose sheet may be displaced with glacial acetic acid and this in turn with a mixture of propionic or butyric acid with catalyst.

In pulling the catalyst through the sheet, the catalyst concentration in the fatty acid may be adjusted as desired by the individual operator. Ordinarily a 1-3% solution of catalyst, such as sulfuric acid or zinc chloride in the fatty acid is sufficient for the incorporating of sufficient catalyst in the cellulose to make for uniform esterification, particularly where the cellulose takes on its own weight of acid.

We have found that the cellulose esters prepared from cellulose in which the acylation catalyst is uniformly distributed therethrough as described herein have better clarity than cellulose esters prepared by conventional processes. Therefore, included within the scope of our invention is the step of pulling through a cellulose sheet by differential in pressure, a solution of an acylation catalyst, such as sulfuric acid in a lower fatty acid to uniformly distribute the catalyst throughout the cellulose preparatory to its esterification.

We claim:

1. A method for activating fibrous cellulose to prepare it for esterification with lower fatty acid anhydride which comprises sucking water through the fibrous cellulose in sheet form to swell the cellulose fibers, followed by sucking concentrated lower fatty acid through the sheet to displace substantially all of the water therefrom, and subsequently sucking through the sheet a 1-3% solution of acylation catalyst in a lower fatty acid to uniformly distribute the catalyst throughout the cellulose preparatory to its esterification.

2. A method for activating fibrous cellulose to prepare it for esterification with lower fatty acid anyhdride which comprises sucking water through the fibrous cellulose in sheet form to swell the cellulose fibers, followed by sucking concentrated lower fatty acid through the sheet to displace substantially all of the water therefrom, and subsequently sucking through the sheet a 1-3% solution of sulfuric acid in lower fatty acid to uniformly distribute the sulfuric acid throughout the cellulose preparatory to its esterification.

3. A method for activating fibrous cellulose to prepare it for esterification with lower fatty acid anhydride which comprises sucking water through the fibrous cellulose in sheet form to swell the cellulose fibers, followed by sucking concentrated acetic acid through the sheet to displace substantially all of the water therefrom, and subsequently sucking through the sheet a 1-3% solution of sulfuric acid in acetic acid to uniformly distribute the sulfuric acid throughout the cellulose preparatory to its esterification.

4. A method for activating fibrous cellulose to prepare it for esterification with lower fatty acid anhydride which comprises sucking water through the fibrous cellulose in sheet form, subjecting the sheet to pressure to reduce its liquid content, followed by sucking concentrated acetic acid through the sheet to displace substantially all of the water therefrom, and subsequently sucking through the sheet a 1-3% solution of sulfuric acid in acetic acid to uniformly distribute the sulfuric acid throughout the cellulose preparatory to its esterification.

5. A method for preparing cellulose acetate having good haze characteristics which comprises sucking water through fibrous cellulose in sheet form to swell the cellulose fibers, followed by sucking concentrated acetic acid through the sheet to displace substantially all of the water therefrom, and subsequently sucking through the sheet a 1-3% solution of sulfuric acid in acetic acid to uniformly distribute the sulfuric acid through the cellulose, mixing the resulting cellulose with acetic anhydride and subjecting the mass to esterifying conditions whereby the cellulose is converted to cellulose acetate.

GEORGE A. RICHTER.
ROBERT H. MacCLAREN.

REFERENCES CITED

The following references are of record in the file of this patent:

UNITED STATES PATENTS

| Number | Name | Date |
|---|---|---|
| 1,728,471 | Bratring | Sept. 17, 1929 |
| 1,936,585 | Dreyfus | Nov. 28, 1933 |
| 2,039,290 | Berl | May 5, 1936 |
| 2,140,639 | Malm | Dec. 20, 1938 |
| 2,143,785 | Malm | Jan. 10, 1939 |

FOREIGN PATENTS

| Number | Country | Date |
|---|---|---|
| 414,461 | Great Britain | Aug. 9, 1934 |